March 23, 1954 — E. T. SCHAVEY — 2,673,281

HEAT GENERATOR

Filed Aug. 29, 1950 — 2 Sheets-Sheet 1

INVENTOR.
EARL T. SCHAVEY
BY
Wilfred Lawson

March 23, 1954  E. T. SCHAVEY  2,673,281
HEAT GENERATOR
Filed Aug. 29, 1950 2 Sheets-Sheet 2
FIG. 3.
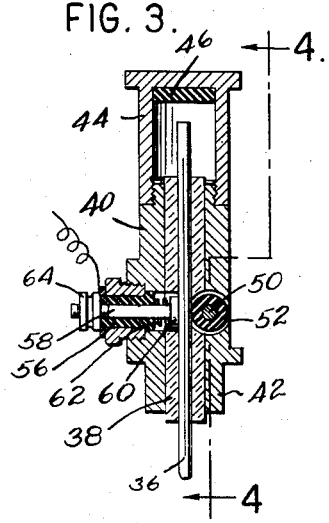
FIG. 4.
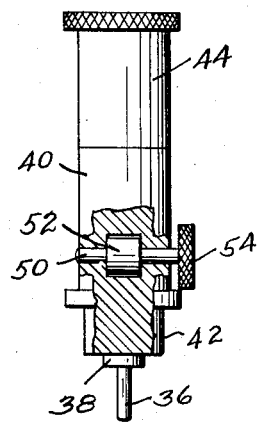
FIG. 5.
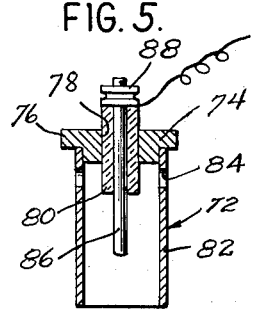
FIG. 6.
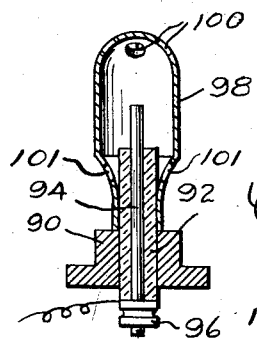
FIG. 7.
FIG. 8.
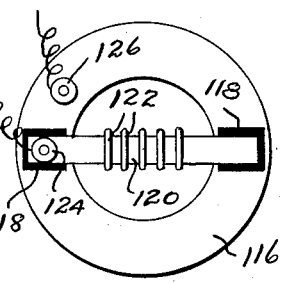
FIG. 9.
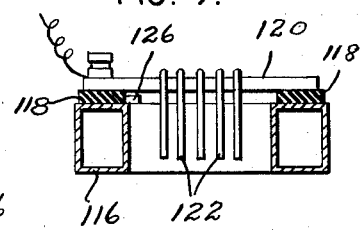
FIG. 10.
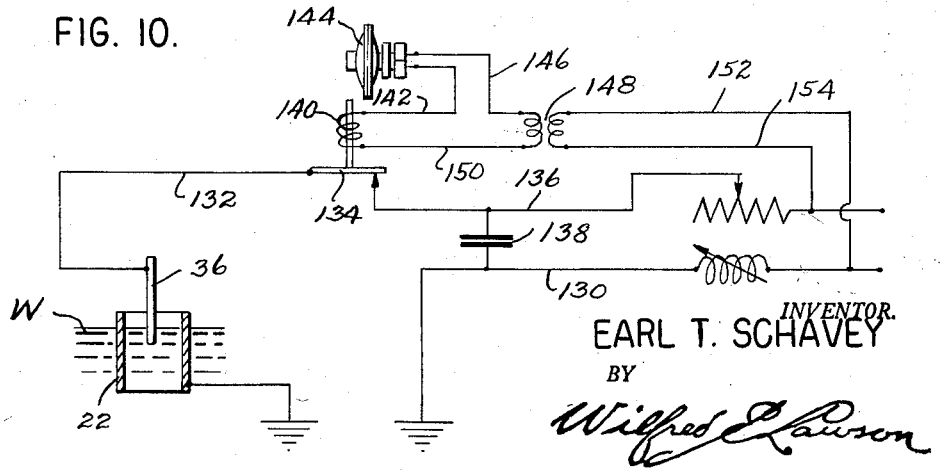
INVENTOR.
EARL T. SCHAVEY
BY
Wilfred E. Lawson Patented Mar. 23, 1954

2,673,281

UNITED STATES PATENT OFFICE 2,673,281

HEAT GENERATOR

Earl T. Schavey, Grand Ledge, Mich.

Application August 29, 1950, Serial No. 182,095

8 Claims. (Cl. 219—40)

1

This invention relates to a heat generator and more particularly to a device which may be employed for cooking, or space heating.

The primary object of the invention is to heat water to the point of ebullition and to confine the exploding gases in a limited area and to super-heat them and subsequently introduce them into a dome through which the heat so generated may be radiated for cooking or space heating.

Another object is to employ electrical energy for heating water and exploding the gases generated thereby, and to confine the exploding gases in a small area in the immediate vicinity of the electrodes so that they may be superheated prior to being introduced into the steam dome of the device.

Still another object is to automatically control the temperature to which the gases in the steam dome become heated so as to avoid overheating of the device.

The above and other objects may be attained by employing this invention which embodies among its features a water reservoir having mounted therein a tubular electrode which is submerged within the water contained in said reservoir and is provided with inlet openings near its bottom, a cooperating electrode carried by the container and having one end thereof submerged below the surface of the water in the container, said cooperating electrode being disposed axially with relation to the tubular electrode, and means to supply electrical energy to the electrodes.

Other features include means for adjusting the depth to which the cooperating electrode is immersed in the water in the container.

In the drawing:

Figure 3 is an enlarged vertical sectional view through the preferred type of cooperating electrode;

Figure 4 is a sectional view taken substantially along the line 4—4 of Figure 3;

Figure 5 is a sectional view through a modified form of cooperating electrode;

Figure 6 is a sectional view through a further modification of the cooperating electrode;

Figure 7 is a sectional view through an electrode of a different type;

Figure 8 is a plan view of a floating electrode combination;

Figure 9 is a transverse sectional view through the floating electrode illustrated in Figure 8;

2

Figure 1:
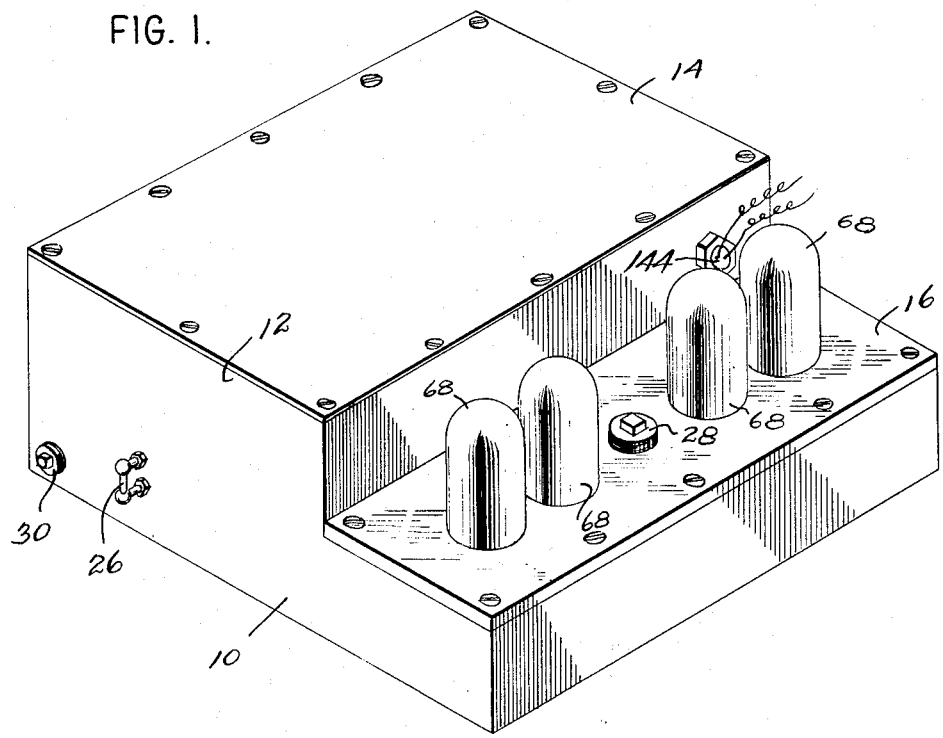
Figure 1 is a perspective view of a heat generator embodying the features of this invention.
Figures 2, 11:
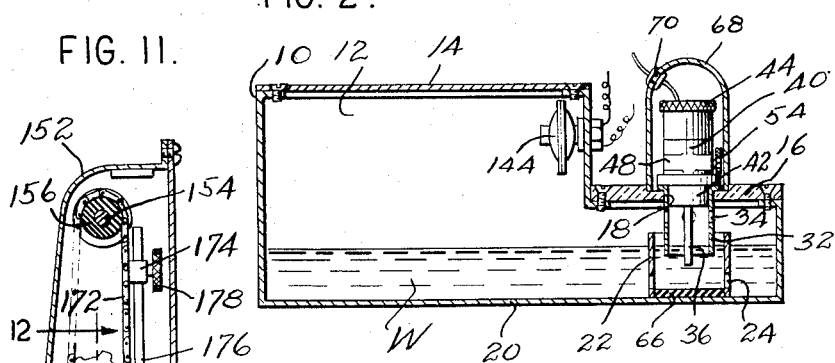
Figure 2 is a transverse sectional view through the heat generator illustrated in Figure 1.
Figure 12:
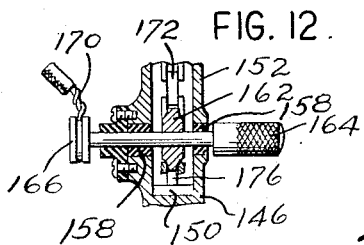

Figure 10 is a typical wiring diagram illustrating the manner in which the device is employed;

Figure 11 is a vertical sectional view through a further modified form of electrode; and Figure 12 is a fragmentary vertical sectional view taken substantially on the line 12—12 of Figure 11.

Referring to the drawings in detail a reservoir 10 is equipped with a steam dome 12 having a top plate 14 which may be flat as illustrated for cooking purposes, or if so desired the top 14 may be formed in any desired contour and provided with heat radiating fins in a conventional manner for space heating. As illustrated, the container 10 is stepped to form a ledge 16 which in the preferred form of the invention comprises a transparent cover plate having formed therein a longitudinal row of longitudinally spaced openings 18 for the reception of the holders of the cooperating electrodes. Carried by the bottom 20 of the reservoir 10 in axial alignment with the openings 18 in the transparent cover plate 16 are upwardly extending tubular electrodes 22 which have electrical contact with the bottom 20 and are provided with annular rows of spaced openings 24 through which the water W contained within the reservoir 10 may enter the electrode 22. The reservoir is equipped with a conventional water gage 26 by which the level of the water W contained therein may be maintained constant with relation to the upper end of the electrode 22. The cover plate 16 is provided intermediate its ends with an internally screw threaded filling opening which is closed by a plug 28, and formed in the reservoir 10 near the bottom thereof at any convenient location is an internally screw threaded opening for the reception of a drain and clean out plug 30.

In the preferred form of the invention, a tubular member 32 is extended through each opening 18 and projects into the reservoir for a short distance below the top of the water W therein in concentric spaced relation to the tubular electrode 22. This tubular member 32 is provided above the tubular electrode 22 with an annular row of peripherally spaced openings 34 through which the heated gases may escape into the steam dome 12.

Entering the electrode 22 in axial alignment with the said electrode and in concentric spaced relation to the tubular member 32 is a cooperating electrode 36. In the preferred form of the invention, the cooperating electrode 36 is mounted for vertical sliding movement in a tubular insulator 38 which may be formed of glass, porcelain or hard rubber and this tubular insulator 38 is mounted in a housing 40 having a nipple 42 at its lower end which fits into the tubular member 32 as will be readily understood upon reference to Figure 2.

A cap 44 encloses the upper exposed end of the cooperating electrode 36 and is equipped at its upper end with a pad 46 of non-conducting material so as to avoid short circuiting of the device should the electrode 36 be moved upwardly within the tubular insulator 38. Mounted in suitable bosses 48 carried by the housing 40 for rotation in said bosses is a shaft 50 carrying a rubber covered friction roller 52, the periphery of which impinges upon the electrode 36 so that when the roller is rotated by the shaft 50, the electrode may be raised or lowered within the tubular insulator 38. A suitable thumb wheel 54 is carried by the shaft 50 so that upon rotating the thumb wheel 54, the electrode 36 may be adjusted vertically in order to regulate the depth to which it is immersed in the water W contained in the reservoir 10.

Mounted in a suitable insulating bushing 56 carried by the side of the housing opposite the roller 52 is a conductor rod 58 carrying at its inner end a head 60 which impinges against the electrode 36 under the influence of a compression coil spring 62. As illustrated in Figure 3, the end of the rod 58 remote from the head 60 is externally screw threaded and carries a conventional binding nut 64 by which a suitable conductor is coupled to the rod 58.

In the preferred form of the invention, a pad 66 of insulating material is supported on the bottom 20 of the reservoir 10 within the confines of the tubular electrode 22 so that short circuiting of the device will be avoided upon lowering the electrode 36 beyond a predetermined limit. Also enclosing the body 40 and the cap 44 of each of the electrodes 36 entering the openings 18 in the transparent plate 16 is a hood 68 which may be provided with an opening for the reception of a bushing 70 through which a conductor leading from the binding nut 64 may be extended.

In the modified form of electrode holder illustrated in Figures 11 and 12 an elongated tubular member 146 is equipped intermediate its ends with an outstanding annular attaching flange 148 and fitted within said tubular member and extending therethrough is a tubular bushing 150 of non-conducting material such as porcelain. A housing 152 is carried by the tubular member 146 and extending through opposite side walls of said housing adjacent the upper ends thereof is a shaft 154 on which is mounted for rotation within said housing a grooved pulley 156 of non-conducting material. Fitted into opposite side walls of the housing 152 adjacent the junction with the tubular member 146 are aligning bushings 158 of non-conducting material and mounted for rotation in said bushings and extending through the housing 152 in parallel relation to the shaft 154 is a shaft 160. Fixed for rotation with said shaft 160 within the housing 152 is a sprocket wheel 162 and carried by said shaft for rotation therewith. Adjacent one side of said housing is a thumb piece 164 by which the shaft 160 and sprocket wheel 162 may be rotated. A suitable conductor coupling 166 is carried by said shaft 160 by which an electrical conductor 170 establishes contact with said shaft.

Trained over the pulley 156 and having meshing engagement with the sprocket wheel 162 is an endless chain 172 carrying a sleeve 174 through which an electrode 176 extends. This electrode extends through the bushing 150 and is adjustably held in the sleeve 174 by a thumb screw 178. It will thus be seen that by turning the thumb piece 164, the electrode may be moved through the bushing 150 to the desired position.

In the modified form of electrode and holder illustrated in Figure 5, a unit designated generally 72 may be substituted in the plate 16 for the electrode 36 and holder thereof previously described by simply lifting out of the openings 18 in the plate 16 the tubular members 32. The unit 72 is substituted in place of the tubular members 32 and comprises a plug 74 having an outstanding annular flange 76 and an axial opening 78 in which a suitable insulating tube 80 is secured. Carried by the plug 74 is a depending tubular member 82 having adjacent its upper end an annular row of peripherally spaced openings 84 which correspond to the openings 34 in the tubular member 32 previously described. Extending through the tubular insulator 80 is an electrode 86 which, when the device is in place in the plate 16, projects beneath the level of the water W within the reservoir 10 in axial alignment with the tubular electrode 22. A binding nut 88 is carried by the outer end of the electrode 86 by means of which a suitable conductor may be connected to the electrode.

In the modified form of the invention illustrated in Figure 6, an electrode and holder is disclosed for use in structures where it is desired to introduce the cooperating electrode through the bottom of the reservoir. The device is provided with a plug 90 through which extends axially an insulator bushing 92 carrying a vertically extending electrode 94, the lower end of which is screw threaded for the reception of a coupling nut 96 by which the electrode may be connected to a conventional electrical conductor. As illustrated in the drawing, the upper end of the electrode projects beyond the upper end of the insulator 92 and carried by the insulator 92 and projecting upwardly and in closing relation with the upper end of the electrode 94 is a hood 98 having vent openings 100 formed therein adjacent the top thereof and water inlet openings 101 formed therein adjacent the upper end of the bushing 92.

In the further modification illustrated in Figure 7, the body 102 is provided with an externally screw threaded boss 104 on which a clamp nut 106 is threaded. The boss 104 is adapted to project through a side of the reservoir 10, and formed in the body adjacent the end thereof remote from the boss 104 is a downwardly opening chamber 108. An insulating bushing 110 extends axially through the boss 104 and the body 102 into the chamber 108 and carried on the interior of said bushing 110 is an electrode 112 which is provided at the end which projects through the boss 104 with external screw threads for cooperation with a conventional nut 114 by which a conductor may be connected to the electrode 112.

The various insulating bushings through which the electrodes extend may be conventionally held in their respective holders by forming intermediate their ends an outstanding annular flange 180 (Fig. 7) and clamping it between a shoulder 182 formed within its respective sleeve and a clamp bushing 184 threaded into the sleeve. Obviously a gas tight seal may be effected by conventional packing washers 186.

In Figures 8 and 9, a float of annular configuration 116 which is preferably formed of metal or like conducting material carries on its upper side in diametrically spaced relation pads 118 of non-conducting material. A bar 120 is supported on the pads 118 and extends transversely across the ring shaped float 116 and carries a group of depending electrodes 122 which project downwardly into the interior of the float 116 as will be readily understood upon references to the drawings.

A binding screw 124 is carried by the bar 120 by means of which a suitable conductor may be connected thereto, and a similar binding screw 126 is connected to the float 116. Obviously, this type of device may be employed without utilizing the tubular electrode 22 or the electrode structures previously described simply by supporting the float 116 on the surface of the water in the reservoir 10.

The device is connected in a circuit such as is typically illustrated in Figure 10 by grounding the tubular electrode 22 to one terminal of the power source which is led through a conductor 130. The electrode 36 is electrically connected through a conductor 132 with a relay actuated switch 134 which in turn is connected through a conductor 136 with the power source. A condenser 138 is bridged across the conductors 130 and 136 in order to suppress radio interference and the like when ebullition of the water W takes place between the electrodes 22 and 36.

The coil 140 of the relay actuated switch 134 is coupled through a conductor 142 to one side of a pressure responsive switch unit 144 which is mounted at a convenient point in the steam dome 12 and the other side of the unit 144 is coupled through the medium of a conductor 146 to one terminal of a transformer 148, the opposite terminal of which is connected through the medium of a conductor 150 with the coil 140. The opposite winding of the transformer 148 is coupled through the medium of the conductors 152 and 154 respectively to the conductors 130 and 136.

In use it will be readily understood that with the electrodes 36 and 22 immersed in the water W as suggested, immersion heating of the water will result and gases released by the ebullition of the water will be confined between the tubular electrode 22 and the tubular member or shield 32, thus subjecting these gases to further electrical treatment so as to cause them to become superheated and when released through the upper end of the tubular electrode 22 and the openings 34 in the tubular member or shield 32, they will enter the steam dome 12 in a superheated condition, thus effectively and economically producing a heated condition thereof. Obviously with the flat top 14, cooking may take place on the top of the steam dome 12 or if so desired, it may be used simply for space heating.

By employing the other electrodes herein disclosed where the gas is released by the ebullition of the water are confined in close proximity to the electrodes, it will be evident that the same results may be achieved.

While in the foregoing there has been shown and described the preferred forms of this invention, it is to be understood that minor changes in the details of construction, combination and arrangement of parts may be resorted to without departing from the spirit and scope of the invention as claimed.

I claim:

1. In a heat generator a water reservoir having two spaced walls, a tubular electrode carried by one of said walls of the reservoir to be submerged in the water therein, a cooperating electrode supported within and in concentric spaced relation to the tubular electrode for submersion at one end in the water in the reservoir, means carried by the reservoir and connected to and insulated from the cooperating electrode for regulating from the outside of the reservoir the depth to which the cooperating electrode is submerged in the water, and means connected to said cooperating electrode to supply electrical energy thereto.

2. In a heat generator a water reservoir having two spaced walls, a tubular electrode carried by one of said walls of the reservoir to be submerged in the water therein, a cooperating electrode supported within and in concentric spaced relation to the tubular electrode for submersion at one end in the water in the reservoir, means connected to the electrodes to supply electrical energy thereto, and a tubular shield carried by and within the reservoir in encircling relation to and insulated from the cooperating electrode and in concentric spaced relation to the tubular electrode.

3. In a heat generator a water reservoir having top and bottom walls, a tubular electrode carried by the bottom wall of the reservoir and extending upwardly in said reservoir, a cooperating electrode carried by the top wall of the reservoir and extending downwardly into and below the top of the tubular electrode and in concentric spaced relation to the tubular electrode, a vented tubular shield carried by the reservoir top wall in encircling relation to the cooperating electrode and spaced concentric relation to and extending into the top of the tubular electrode, the bottom of said shield being designed to be submerged beneath the top of the water in the reservoir, and means connected to the electrodes to conduct electrical energy thereto.

4. In a heat generator a water reservoir having top and bottom walls, a tubular electrode carried by the bottom wall of the reservoir and extending upwardly and projecting beyond top of water in said reservoir in the use of the generator, a cooperating electrode carried by the top wall of the reservoir above the level of the water therein, said cooperating electrode extending downwardly into the top of and in concentric spaced relation with the tubular electrode, a vented tubular shield carried by the top wall of the reservoir in encircling relation to and insulated from the cooperating electrode and spaced concentric relation to the tubular electrode, the lower end of said shield being submerged beneath the top of the water in the reservoir in the use of the generator, means connected to the electrodes to conduct electrical energy thereto, and means insulated from and connected to the cooperating electrode for regulating from outside the reservoir the depth to which it enters the water below the top thereof.

5. In a heat generator of the character set forth, a water reservoir having a top wall of insulation material and a bottom wall, said top wall being provided with an opening therein, an elongate cylindrical body having an end secured in said opening, the body having a passage extending longitudinally therethrough, a tubular insulator secured in said body passage, an elongate electrode in and extending through said insulator with one end projecting into the reservoir, an elongate electric current conductor supported by and insulated from said body for movement in a direction perpendicular to the electrode, the insulator having an opening for the extension of an end of the conductor therethrough and into contact with the electrode, the outer end of the conductor being adapted to have an electric current supply conductor connected therewith, a friction roller of insulation material rotatably supported by the body and engaging said electrode, means for turning said roller from the outside of the reservoir, for effecting longitudinal movement of the electrode, and a cylindrical electrode within the reservoir encircling the said one end of the first electrode and spaced therefrom for electrical connection therewith through water in the reservoir, said cylindrical electrode being grounded.

6. The invention as set forth in claim 5, wherein said cylindrical electrode is supported by the insulation wall to extend downwardly toward said bottom wall, and a second cylindrical electrode supported on the bottom wall and extending upwardly into spaced encircling relation with the lower end of the first cylindrical electrode.

7. In a heat generator of the character set forth, a water reservoir having a wall provided with an opening therein, a body secured in said opening and having a passage leading into the reservoir, a tubular insulator secured in said body passage, an elongate electrode secured in and extending through said insulator with one end projecting into the reservoir, means for connecting an electric current conductor to the other end of the electrode, a cylindrical electrode encircling the said one end of the first electrode and spaced therefrom for electrical connection therewith through water in the reservoir, said cylindrical electrode being grounded, said first electrode being longitudinally slidable in and through said insulator, and a rotatable member operatively coupled with the first electrode and electrically insulated therefrom for effecting the longitudinal movement of the first electrode from the outside of the water reservoir.

8. In a heat generator of the character set forth, a water reservoir having a wall provided with an opening therein, a body secured in said opening and having a passage leading into the reservoir, a tubular insulator secured in said body passage, an elongate electrode secured in and extending through said insulator with one end projecting into the reservoir, means for connecting an electric current conductor to the other end of the electrode, a cylindrical electrode encircling the said one end of the first electrode and spaced therefrom for electrical connection therewith through water in the reservoir, said cylindrical electrode being grounded, said elongate electrode being slidable in and through the tubular insulator, a rotatably supported roller of insulation material having peripheral frictional contact with said elongate electrode for effecting the movement of the latter, and means operable from outside the water reservoir for rotating said roller to effect the longitudinal adjustment of the elongate electrode.

EARL T. SCHAVEY.

References Cited in the file of this patent

UNITED STATES PATENTS

| Number | Name | Date |
|---|---|---|
| 1,403,102 | Perkins | Jan. 10, 1922 |
| 1,993,843 | Kaelin | Mar. 12, 1935 |
| 2,106,019 | Roberson | Jan. 18, 1938 |
| 2,180,445 | Vickery | Nov. 21, 1939 |
| 2,319,477 | Rush | May 18, 1943 |